(12) United States Patent
Ellis et al.

(10) Patent No.: US 6,469,849 B1
(45) Date of Patent: Oct. 22, 2002

(54) FIELD RATIOING DEMODULATION CIRCUIT FOR A NULL-TYPE SERVO PATTERN

(75) Inventors: Timothy F. Ellis, Tonka Bay; Alexei H. Sacks, St. Louis Park, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 09/655,479

(22) Filed: Sep. 5, 2000

Related U.S. Application Data

(62) Division of application No. 09/268,118, filed on Mar. 15, 1999, now Pat. No. 6,195,220.
(60) Provisional application No. 60/086,278, filed on May 21, 1998.

(51) Int. Cl.[7] .............................. G11B 5/02; G11B 5/596
(52) U.S. Cl. ....................................... 360/29; 360/77.08
(58) Field of Search ................................ 360/77.08, 75, 360/77.01, 77.02, 77.04, 77.07, 77.11, 29, 48

(56) References Cited

U.S. PATENT DOCUMENTS

| | | | |
|---|---|---|---|
| 4,297,734 A | 10/1981 | Laishley et al. | 360/78 |
| 4,511,938 A | 4/1985 | Betts | 360/77 |
| 4,535,372 A | 8/1985 | Yeakley | 360/77 |
| 4,679,103 A | 7/1987 | Workman | 360/77 |
| 4,954,907 A | 9/1990 | Takita | 360/78.07 |
| 5,041,926 A | 8/1991 | Ockerse et al. | 360/77.05 |
| 5,089,757 A | 2/1992 | Wilson | 318/560 |
| 5,117,408 A | 5/1992 | Weispfenning et al. | 369/32 |
| 5,136,439 A | 8/1992 | Weispfenning et al. | 360/77.08 |
| 5,345,342 A | 9/1994 | Abbott et al. | 360/48 |
| 5,576,906 A | 11/1996 | Fisher et al. | 360/77.08 |
| 5,602,692 A | 2/1997 | Frietas et al. | 360/77.08 |
| 5,668,678 A | 9/1997 | Reed et al. | 360/51 |
| 5,717,538 A | 2/1998 | Cheung et al. | 360/77.08 |
| 5,774,298 A | 6/1998 | Cheung et al. | 360/77.08 |
| 5,818,659 A | 10/1998 | Cheung et al. | 360/77.08 |
| 5,825,579 A | 10/1998 | Cheung et al. | 360/77.08 |
| 5,838,512 A | 11/1998 | Okazaki | 360/51 |
| 5,854,714 A | 12/1998 | Reed et al. | 360/51 |
| 5,867,341 A | 2/1999 | Volz et al. | 360/77.08 |
| 6,034,830 A | 3/2000 | Sasamoto | 360/48 |

FOREIGN PATENT DOCUMENTS

| | | |
|---|---|---|
| EP | 0 420 439 A1 | 4/1991 |
| EP | 0 828 242 A1 | 9/1996 |
| EP | 0 798 704 A1 | 10/1997 |
| EP | 0 262 690 A2 | 4/1998 |
| WO | WO 97 28529 | 8/1997 |

OTHER PUBLICATIONS

Tuttle, G.T. et al., "A 130MB/S PRML Read/Write Channel with Digital–Servo Detection", IEEE International Solid State Circuits Conference, vol. 39, Feb. 1, 1996, pp. 64, 65, 419.

Reed, D.E. et al., "Digital Servo Demodulation in a Digital Read Channel", 8th Annual Magnetic Recording Conference on Magnetic Recording Systems, Sep. 8–10, 1997, pp. 13–16.

Abramovitch, D.Y., "Customizable Coherent Servo Demodulation for Disk Drives", Proceedings of the 1998 American Control Conference, vol. 5, Jun. 24–26, 1998, pp. 3043–3049.

Primary Examiner—Andrew L. Sniezek
(74) Attorney, Agent, or Firm—Theodore M. Magee; Westman, Champlin & Kelly, P.A.

(57) ABSTRACT

A method of generating a position error estimate generates a phase field signal and a position error field signal. A set of operations is performed on the phase field signal and the same set of operations is performed on the position error field signal. The result obtained by performing the set of operations on the position error field signal is divided by the results obtained by performing the set of operations on the phase field signal. The result of the division is the position error estimate. In addition, a demodulation circuit is provided that utilizes field ratioing.

3 Claims, 13 Drawing Sheets

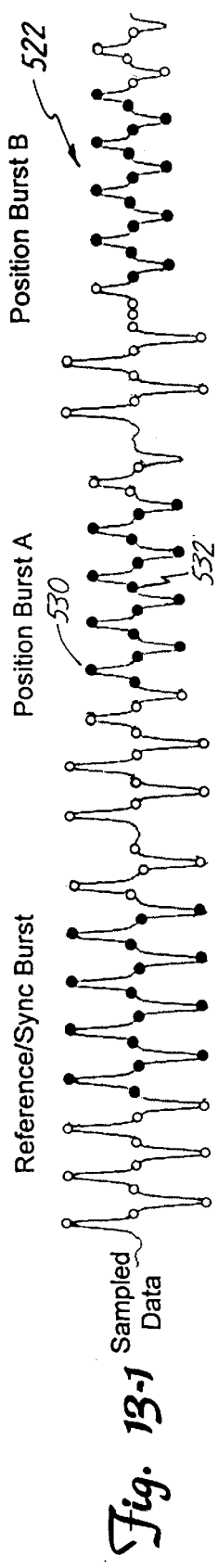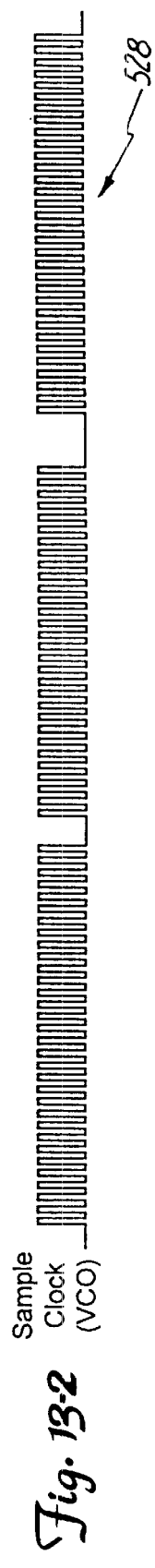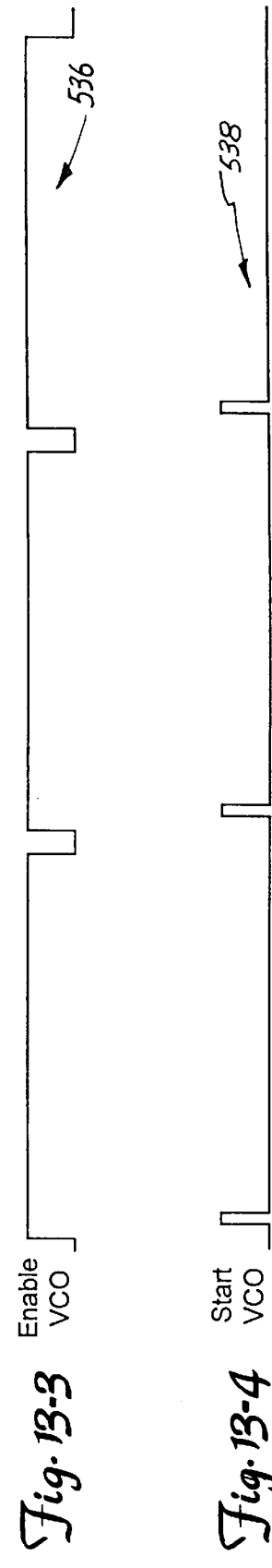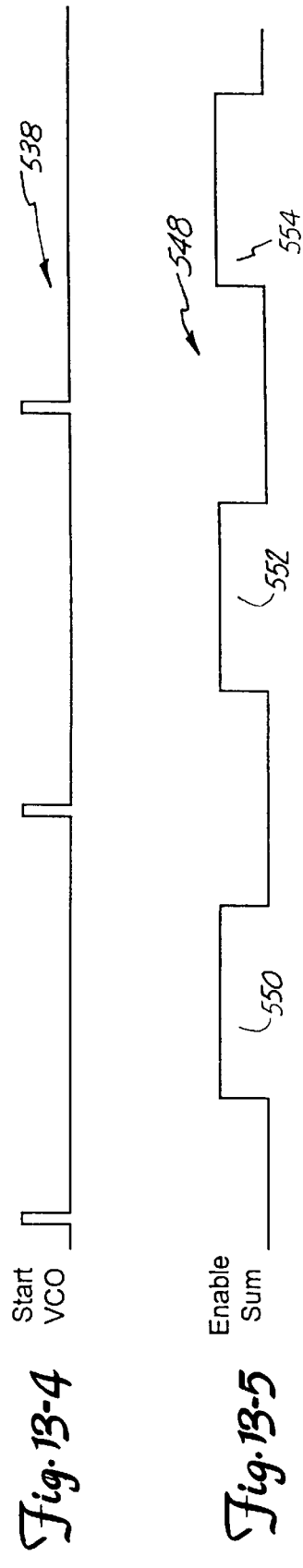

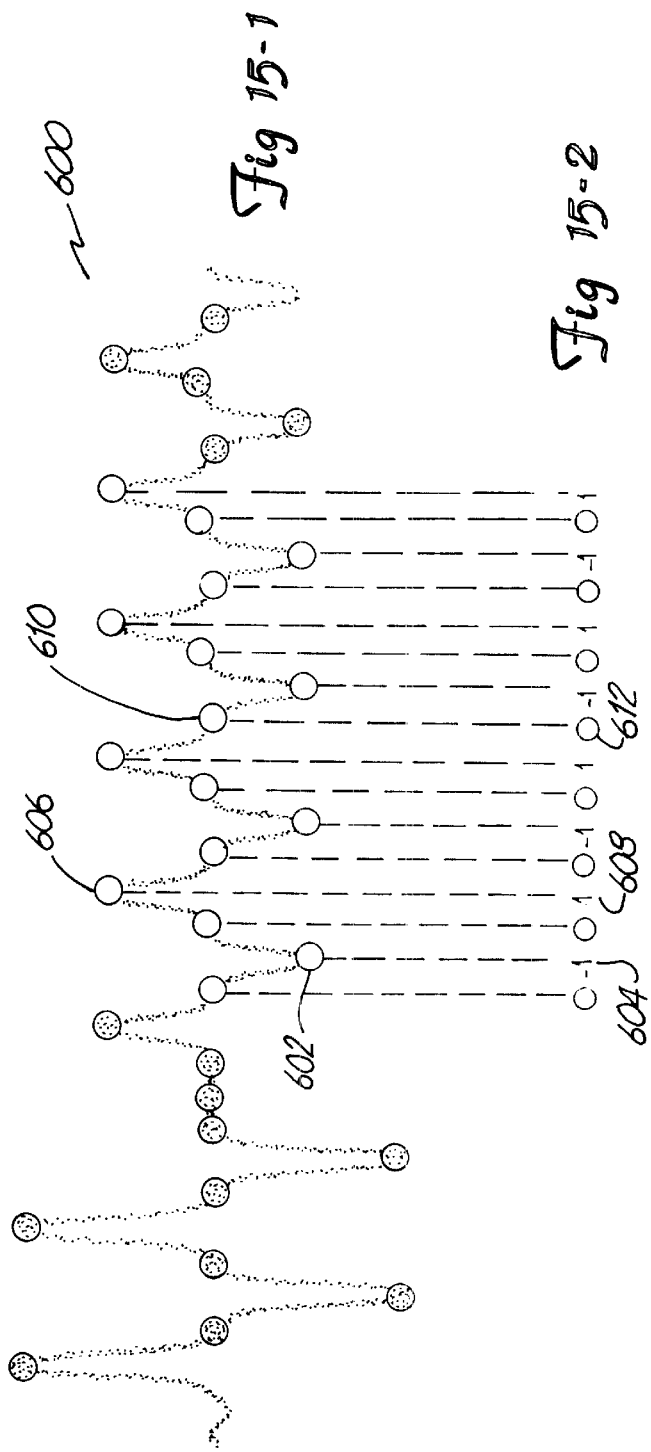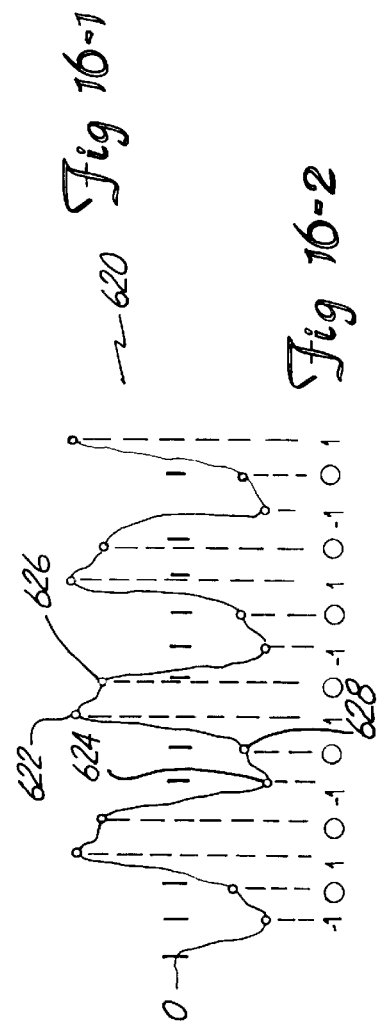

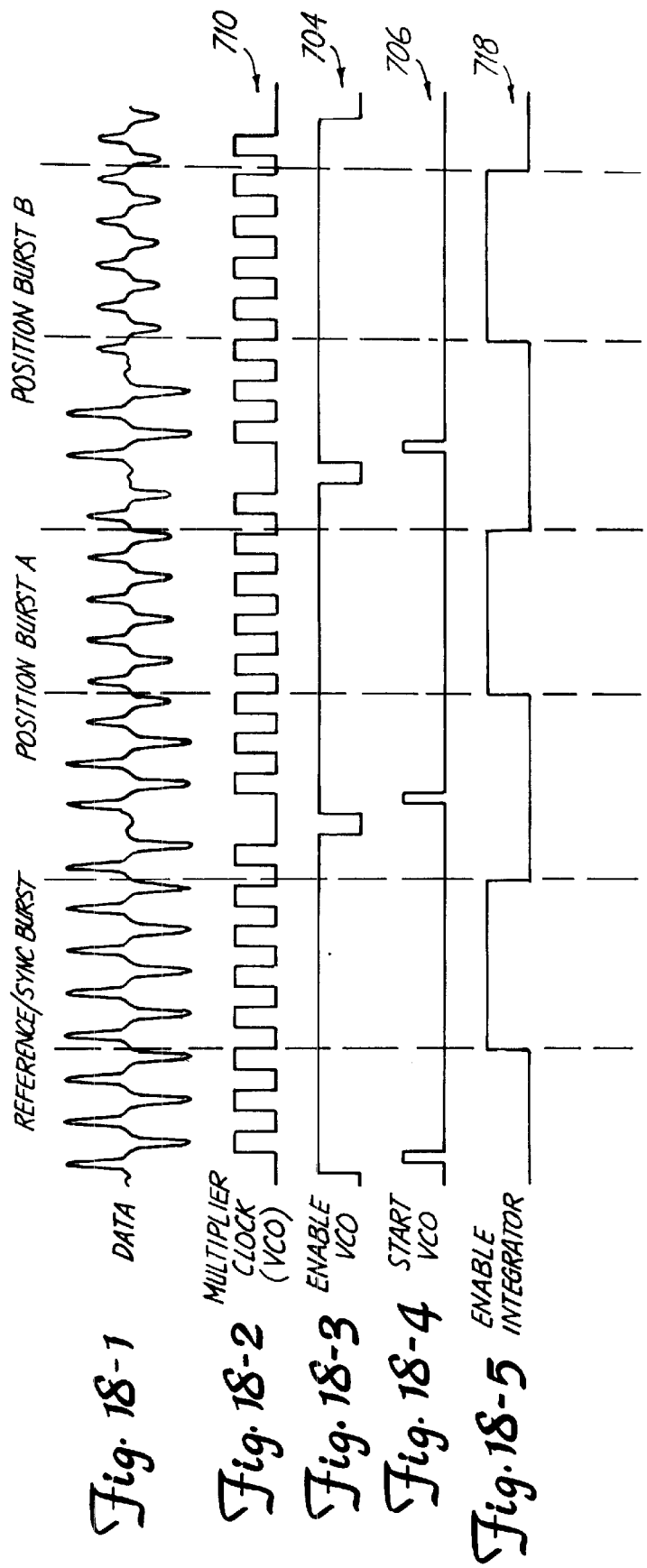

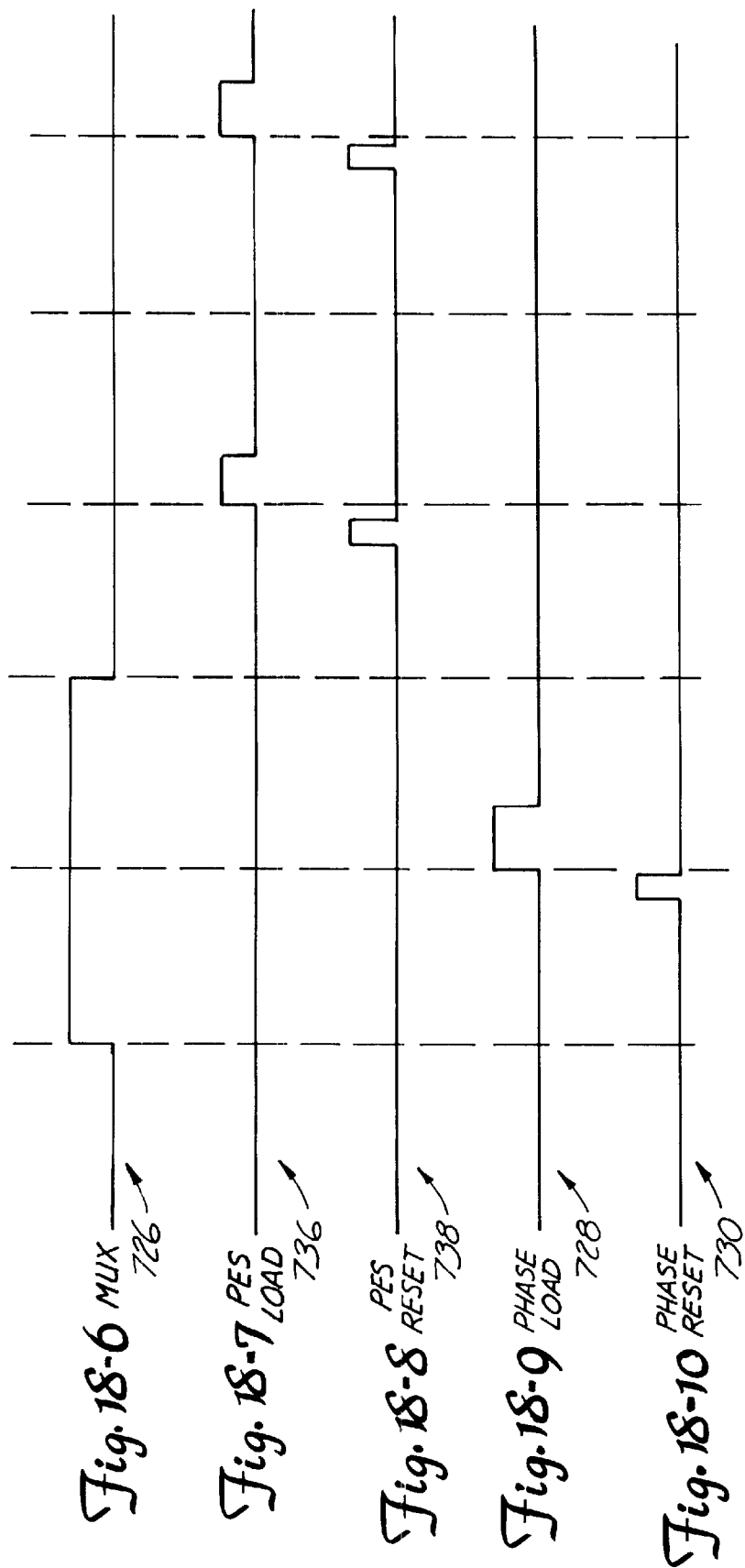

FIELD RATIOING DEMODULATION CIRCUIT FOR A NULL-TYPE SERVO PATTERN

REFERENCE TO RELATED APPLICATIONS

This application is a divisional of a U.S. patent application having Ser. No. 09/268,118, filed on Mar. 15, 1999 entitled METHOD AND APPARATUS UTILIZING FIELD RATIOING DEMODULATION TECHNIQUES FOR A NULL-TYPE SERVO PATTERN, now U.S. Pat. No. 6,195,220.

This application claims further priority through its parent application listed above from a U.S. Provisional Application having Ser. No. 60/086,278, filed on May 21, 1998 and entitled FIELD RATIOING DEMODULATION TECHNIQUES FOR A NULL TYPE SERVO PATTERN.

Cross-reference is also made to three U.S. utility applications filed on Mar. 15, 1999 and assigned to the same assignee as the present application. Specifically, cross-reference is made to: a U.S. utility application entitled "ASYNCHRONOUS ANALOG DEMODULATOR AND METHOD FOR A NULL-TYPE SERVO PATTERN" having Ser. No. 09/268,012 pending; a U.S. utility application entitled "SYNCHRONOUS DIGITAL DEMODULATOR WITH INTEGRATED READ AND SERVO CHANNELS" having Ser. No. 09/268,009 now U.S. Pat. No. 6,181,505, and a U.S. utility application entitled "ASYNCHRONOUS DIGITAL DEMODULATOR AND METHOD FOR A NULL-TYPE SERVO PATTERN;" having Ser. No. 09/268,584, now U.S. Pat. No. 6,243,224.

FIELD OF THE INVENTION

The present invention relates to storage devices. In particular, the present invention relates to servo systems in storage devices.

BACKGROUND OF THE INVENTION

A storage device, such as a disc drive, typically uses a servo system to position a read or write head over a recording track were digital information is stored. The servo system relies on servo information stored either on a dedicated disc surface in a multidisc system or in servo sectors that are radialy dispersed throughout each disc. The servo information gives coarse position information such as the track number of the track that the head is positioned over and possibly the angular sector that the head is positioned over. The servo information also includes fine position information that describes the radial location of the head within a track.

The fine position information is generally stored using a servo field pattern that is a combination of several servo fields. There are several types of servo field patterns, including "null-type" servo patterns, "split-burst amplitude" servo patterns, and "phase type" servo patterns.

A null-type servo pattern includes at least two fields, which are written at a known phase relation to one another. The first field is a "Phase" or "Sync" field, which is used to lock the phase and frequency of the read channel to the phase and frequency of the read signal. The second field is a position error field, which is used to identify the distance of the head from the track centerline.

For a null-type position error field, the magnetization pattern is such that when the head is directly straddling a track centerline, the amplitude of the read signal is ideally zero. As the head moves away from the desired track centerline, the amplitude of the read signal increases. When the head is half way between the desired track centerline and the centerline of an adjacent track, the read signal has a maximum amplitude.

The magnetization pattern on one side of a track centerline in the null-type position error field is written 180 degrees out of phase to the magnetization pattern on the other side of the track centerline. Thus, the phase of the read signal in the position error field relative to the phase of the read signal from the sync field indicates the direction that the head is displaced from the track centerline.

To control the servo system, a single position error value is determined in each servo sector. Such position error values are typically created by demodulating the read signal associated with the position error field. Typically, the magnitude of a position error value indicates the distance of the head from the track centerline, and the sign of the position error value indicates the direction of the head's displacement.

Demodulation of the read signal from a null-type pattern has, in the past, always been a synchronous process. In a synchronous process, the exact phase of the read signal of the position error field is known from the phase field read signal because the phase field is written at a known and fixed phase relation to the position error field. A phase locked loop (PLL) is typically used to acquire the phase of the phase field, and this phase information is used for demodulating the position error field signal. The phase field must therefore be sufficiently long to enable the PLL to lock on to the phase and frequency of the read signal. For example, the phase field may be 3 to 4 times longer than the position error field.

Ensuring a consistent phase relationship between the phase field and the position error field in each servo sector of a disc is critical to accurate positioning of the head. If the phase between these two fields is not consistent at each servo field, a different position error value will be obtained at two different servo fields even though the head remains in the same radial position within the track. To insure this consistency, great effort and expense has been expended toward building consistent phase locked loops that operate the same in every servo field.

The position error value generated by the servo system ideally changes linearly as the head moves radially across the track. Such linear changes simplify the calculations needed to determine the amount by which the head must be moved to bring it to a desired location. In general, servo systems do not produce position error values that change linearly as the head moves radially across a track. In particular, as a head moves radially across a track, the read signal generated by the read head tends to fluctuate due to the geometry of the head. To reduce the effects of such fluctuations, the prior art has used automatic gain control systems to automatically adjust the gain of the servo loop so that it remains constant at all track positions for the head. The amount of gain that must be introduced by the automatic gain control is set by a control circuit that must be initialized either at disc burn-in or periodically during the life of the disc drive.

Thus, in the prior art, a great deal of effort has been expended on normalizing the position error value so that it is consistent across different servo areas. This has resulted in complex and costly structures that drive up the cost of the disc drive.

SUMMARY OF THE INVENTION

A method of generating a position error estimate generates a phase field signal and a position error field signal. A set of operations is performed on the phase field signal and the same set of operations is performed on the position error field signal. The result obtained by performing the set of operations on the position error field signal is divided by the results obtained by performing the set of operations on the phase field signal. The result of the division is the position error estimate. A circuit and system for practicing the method are also provided.

BRIEF DESCRIPTION OF THE DRAWINGS

FIGS. 13-1 through 13-5 are signal diagrams of signals associated with a digital demodulator of the present invention.

FIGS. 15-1 through 15-2 are timing diagrams showing the relationship between rectification values and a read signal for one embodiment of the invention.

FIGS. 16-1 through 16-2 are timing diagrams showing the relationship between rectification values and a read signal for a second embodiment of the invention.

FIGS. 18-1 through 18-10 are timing diagrams showing signals associated with the block diagram of FIG. 17.

DETAILED DESCRIPTION OF PREFERRED EMBODIMENTS

Figure 1:
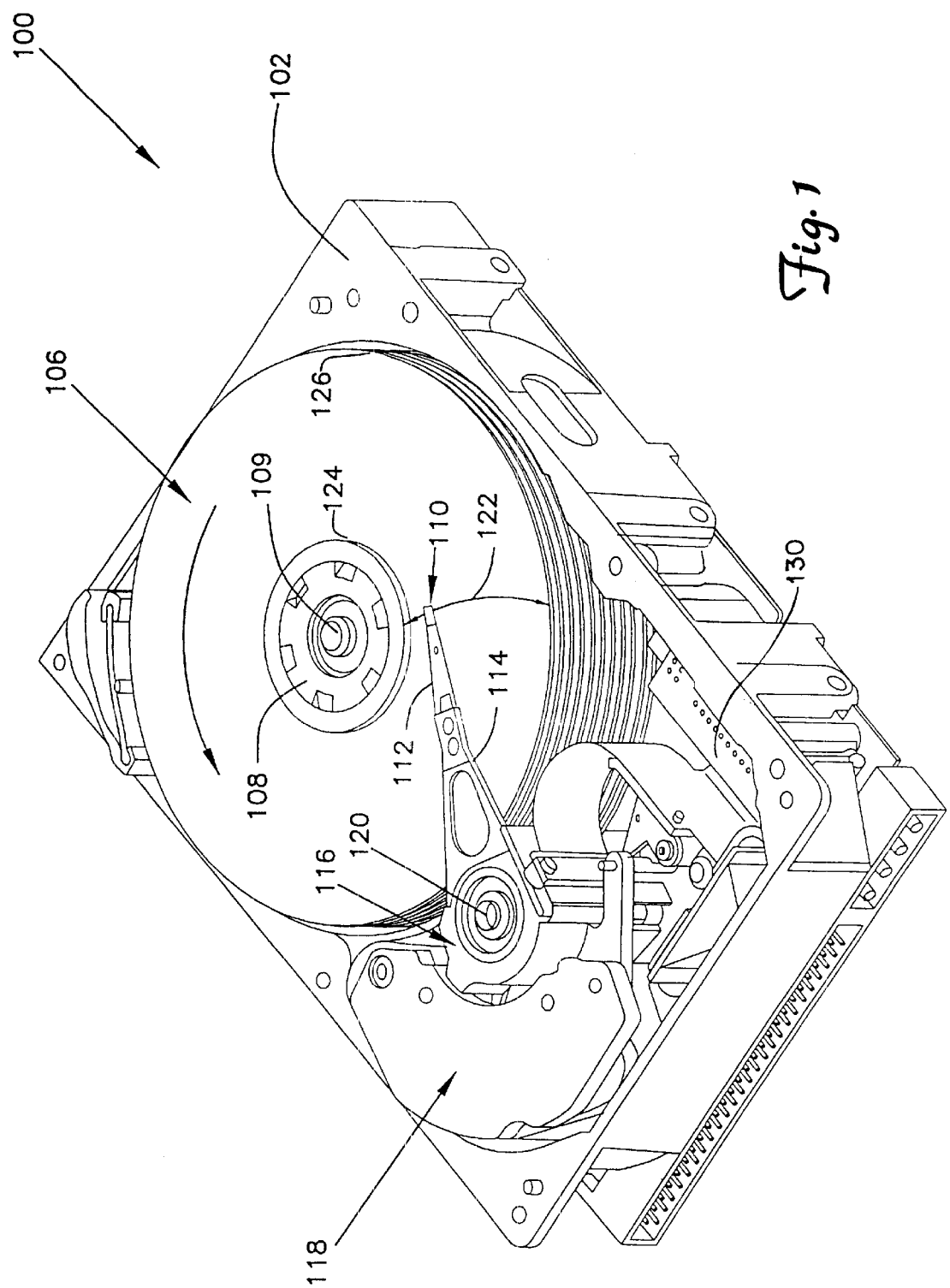
FIG. 1 is a perspective view of a disc drive of the present invention.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
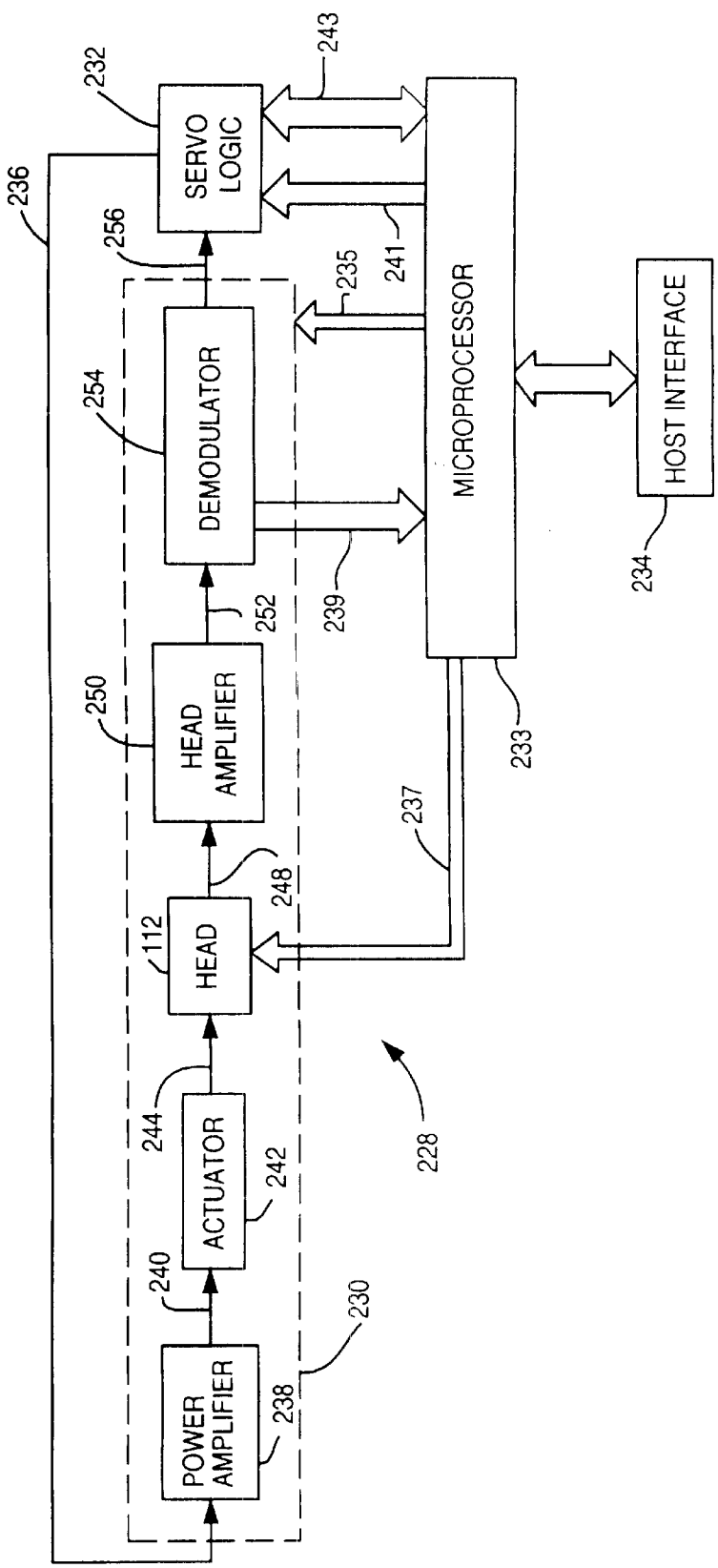
FIG. 2 is a block diagram of a servo loop in a disc drive.

FIG. 2 is a block diagram of an information storage device 228, such as magnetic disc drive 100 of FIG. 1. Storage device 228 includes three main components: plant 230, servo logic 232, and microprocessor 233. Microprocessor 233 communicates with a host (not shown) through a host interface 234. Microprocessor 233 controls the reading and writing of information to a disc based on instructions received from the host. Specifically, microprocessor 233 applies control signals through control lines 235 to plant 230 to control various functions of plant 230 including selection of a head, strength of a write current, read sensitivity and mode of operation (read, write, or track seek). In addition, microprocessor 233 provides write data along data bus 237 and receives read data along a data bus. The recovered data is provided to the host through host interface 234.

Microprocessor 233 controls the movement of head 112 over the disc through servo logic 232, which is connected to microprocessor 233 through an address bus 241 and a bi-directional data bus 243. Using address bus 241 and data bus 243, microprocessor 233 is able to store a desired location for the head in a memory location within servo logic 232. This memory location is accessed by servo logic 232, which issues a current command 236 to plant 230 based upon the stored value and the current position of the head. Microprocessor 233 is also able to retrieve head position information stored in servo logic 232's memory locations using address bus 241 and data bus 243.

Within plant 230, current command 236 is received by power amplifier 238, which converts the voltage of current command 236 into a current signal 240. Current signal 240 is provided to and controls an actuator 242, which includes voice coil motor 134 of FIG. 1 that is driven by, and accelerates at a rate determined by, the current of current signal 240. Actuator 242 translates the current of current signal 240 into mechanical movement 244, which moves head 112 relative to the medium.

Head 112 detects data and servo patterns embedded within the medium as it moves relative to the medium. The servo patterns contain information about the position of the head relative to the medium and cause the head to produce a low-level signal 248 that contains encoded position information. A head amplifier 250 amplifies the low-level signal 248 to produce amplified signal 252, which is less susceptible to noise and which is easier to decode. Amplified signal 252 is input to demodulator 254, which interprets the encoded head signal and supplies a demodulator position measurement 256 to servo logic 232, and data to microprocessor 233 along data line 239.

Servo logic 232 applies demodulator position measurement 256 to a linearity table that relates the demodulator position measurement 256 to the actual position of the head. Thus, servo logic 232 can determine the position of head 112 and issue a new current command 236 based on this position and the desired position set by microprocessor 233.

There are two basic modes of operation for storage device 228. In one mode, known as track seeking, microprocessor 233 instructs servo logic 232 to move the head across the medium to a new track. In the second mode of operation, known as track following, microprocessor 233 instructs servo logic 232 to keep the head located over a position within a track. Track following is not a completely passive mode since servo logic 232 must move the head in order to keep it steady relative to a track on the medium. This movement is necessary because the tracks include irregularities and servo logic 232 must move head 112 in order to follow these irregularities. During track following, the head is kept in position using the servo loop formed between plant 230 and servo logic 232. Specifically, as head 112 moves off position, low level signal 248 begins to change because the head is reading different parts of the servo patterns embedded in the medium. This change in low level signal 248 causes similar changes in amplified signal 252 and position measurement 256. In response to the change in position measurement 256, servo logic 232 changes current command 236 so that head 112 moves toward its original position over the track.

The servo loop described above has a frequency dependent response to irregularities in the track in the sense that its ability to respond to irregularities in the track decreases as the frequencies of those irregularities increases. In this sense, the irregularities of the track can by thought of as an input signal to the servo loop and the servo loop's response to those irregularities can be thought of as the gain of the servo loop. For certain types of head 112, specifically magnetoresistive heads, the frequency response of the servo loop changes as the position of head 112 changes within a track. Thus, the head will respond faster to track irregularities in different parts of a track.

Figure 3:
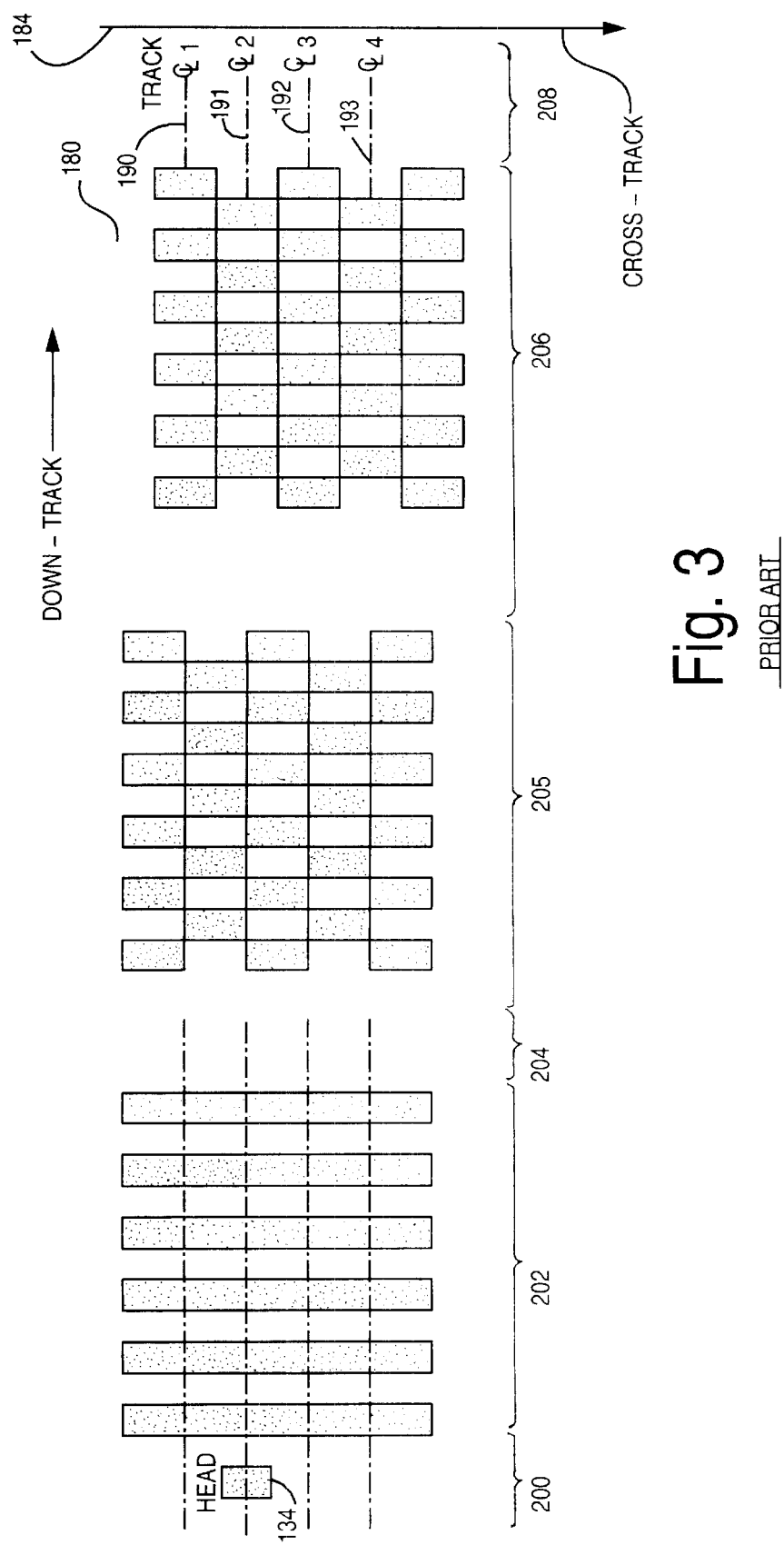
FIG. 3 is a pattern layout of a servo pattern of the prior art.

FIG. 3 is a diagram showing the essential portions of a null-type servo magnetization pattern for a servo section 180 used in the prior art. The radial dimension of disc 122 is shown vertically, and the angular dimension of disc 122 is shown horizontally. Arrow 182 indicates a down-track direction, or angular dimension, of disc 122. Arrow 184 indicates a cross-track direction, or radial dimension, of disc 122. FIG. 2 shows four track centers 190, 191, 192 and 193, which are labeled "1", "2", "3" and "4", respectively. Head 134 is aligned with track center "2" along cross-track direction 184.

The shaded regions in FIG. 3 correspond to regions of opposite magnetic polarity as compared to the non-shaded regions. For example, in a longitudinal recording system, if the longitudinal magnetization in the non-shaded regions were right to left in the figure, then the longitudinal magnetization in the shaded regions would be left to right. Within these regions, the magnetic medium is saturated in either longitudinal direction, as is standard practice in digital magnetic recording.

Servo sector 180 includes leading fields 200, "sync" or "phase" field 202, middle fields 204, normal position error field 205, quadrature position error field 206 and trailing fields 208. Leading fields 200, middle fields 204 and trailing fields 208 may be "empty" as shown in FIG. 3 or may include additional servo data. For example, middle fields 204 may include a track number, or a sector number. Phase field 202 contains radially coherent magnetic transitions. As head 134 passes over phase field 202, the magnetization pattern within phase field 202 induces an oscillating signal in the output of head 134. Normal position error field 205 and quadrature position error field 206 contain null-type magnetic patterns. The quadrature magnetic pattern of quadrature position error field 206 is offset by one-half of a track width with respect to the normal magnetic pattern of normal position error field 205. In some null-type servo patterns, the quadrature magnetic pattern is split in half by placing half of the quadrature pattern before the normal pattern and half of the quadrature pattern after the normal pattern.

Figure 4:
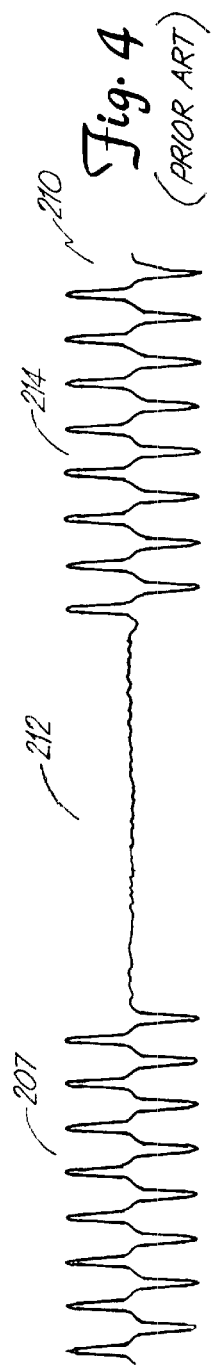
FIG. 4 is a read signal produced by a read head as it passes over the pattern of FIG. 3.

FIG. 4 is a waveform diagram showing a portion of the read signal 210 of the prior art as head 134 passes over phase field 202, middle fields 204, normal position error field 205 and quadrature position error field 206 while directly straddling centerline 191 of track 2. Read signal 210 can be time-wise divided into a phase field signal 207 that is produced when the head passes over phase field 202, a normal position error signal 212 produced when the head passes over normal position error field 205 and a quadrature position error field signal 214 produced when the head passes over quadrature position error field 206. Note that because head 134 is straddling a track centerline to produce read signal 210, normal position error field signal 212 is substantially zeroed.

Figure 5:
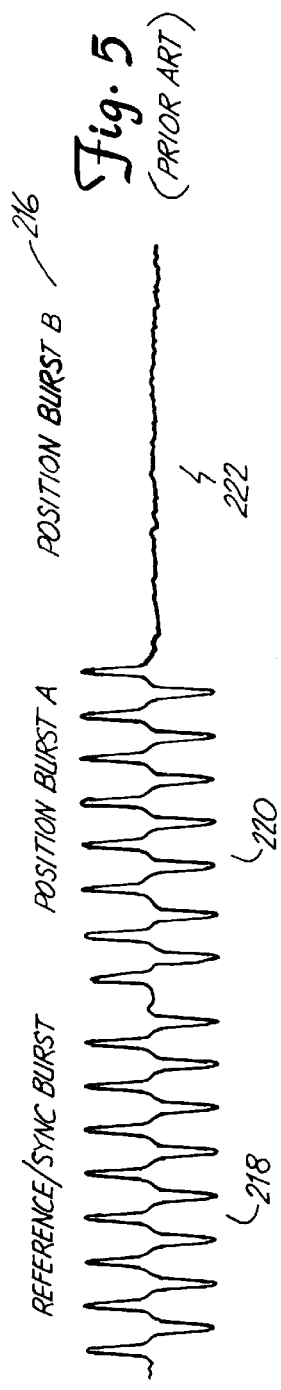
FIG. 5 is a read signal produced by a read head as it passes over the pattern of FIG. 3.
Figure 6:
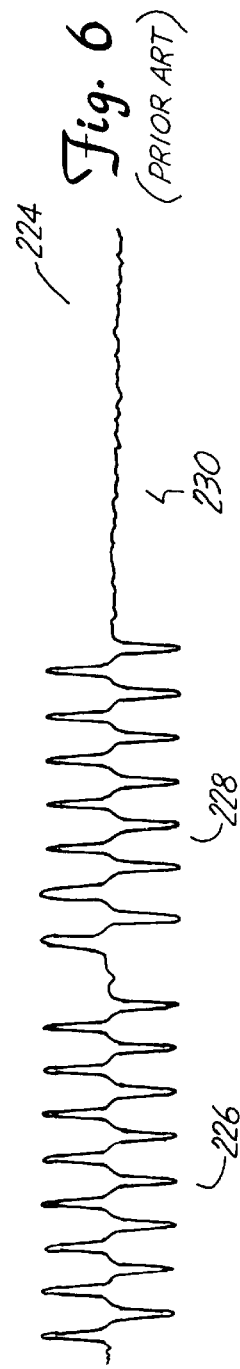
FIG. 6 is a read signal produced by a read head as it passes over the pattern of FIG. 3.

FIG. 5 is a waveform diagram showing a portion of a read signal 216 when head 134 is halfway between centerlines 190 and 191 of tracks 1 and 2, respectively. Read signal 216 can be divided into phase field signal 218, normal position error field signal 220, and quadrature position error field signal 222, which are created by head 134 as it passes over phase field 202, normal position error field 205 and quadrature position error field 206, respectively. FIG. 6 is a waveform diagram showing a portion of a read signal 224 when head 134 is half-way between centerlines 191 and 192 of tracks 2 and 3, respectively. Read signal 224 can be divided into phase field signal 226, normal position error field signal 228 and quadrature position error field signal 230. Note that normal position error field signal 220 in FIG. 5 is 180° out of phase from normal position error field signal 228 in FIG. 6.

Figure 7:
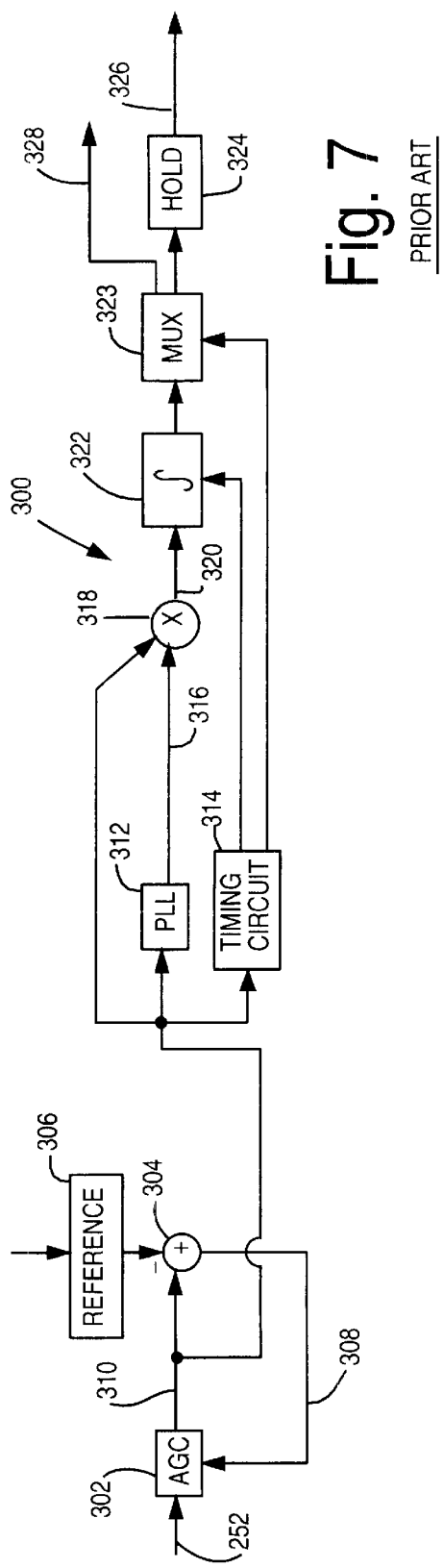
FIG. 7 is a block diagram of an analog demodulator of the prior art.

FIG. 7 is a block diagram of a demodulator 300 that represents one embodiment of demodulator 254 of FIG. 2 of the prior art. Demodulator 300 receives amplified signal 252 at an input to an automatic gain control 302. Automatic gain control 302 is part of a feedback loop that includes a summing circuit 304, which is connected to the output of automatic gain control 302. Summing circuit 304 also receives a reference value 306 created by servo logic 232 of FIG. 2. Reference value 306 is calculated by servo logic 232 to ensure that the gain of the servo loop remains constant at all track locations. Summing circuit 304 subtracts the reference value 306 from the magnitude of the output of automatic gain control 302 to produce a feedback value 308 that is fed back to automatic gain control 302. Based on feedback value 308, automatic gain control 302 amplifies amplified signal 252 until the gain control output 310 from automatic gain control 302 has a magnitude that is approximately equal to the magnitude of reference value 306.

Gain control output 310 is provided to a phase locked loop 312 and a timing circuit 314. Phase locked loop 312 uses the phase field signal to create a clock output 316 that is typically a square wave synchronized to the phase and frequency of the phase field signal. Phase locked loop 312 continues to generate clock signal 316 based on the phase field signal even after the phase field signal ends and the normal position error field signal begins. The normal position error signal follows the phase field signal on gain control output 310 and is provided to a multiplier 318 along with clock signal 316.

Multiplier 318 multiplies the normal position error signal by clock signal 316 to produce a product signal 320. Product signal 320 is provided to an integrator 322, which receives timing control signals from timing circuit 314. The timing control signals cause integrator 322 to integrate product signal 320 over some portion of the period of time associated with the normal position error signal. The output of integrator 322 is a normal position error value, which is routed by a multiplexer 323 to a hold circuit 324 where it is held for later use.

Product signal 320 represents a rectified version of the normal position error signal. To achieve proper rectification, the prior art required that clock signal 316 have a known and exact phase relationship to the normal position error signal. Any errors in the phase relationship cause product signal 320 to be inaccurate and thus cause the normal position error value created by integrator 322 to be inaccurate.

After the normal position error signal, the next signal on gain control output 310 is the quadrature position error signal. The quadrature position error signal is also provided to multiplier 318, which multiplies the quadrature signal by clock signal 316 to produce product signal 320. Product signal 320 is then integrated by integrator 322 to produce a quadrature position error value at the output of integrator 322.

The quadrature position error value is then routed by multiplexer 323 to output 328. The quadrature position error value on output 328 and the normal position error value on output 326 are then used to calculate the position of the head within the track. Such calculations are well known in the art.

Figure 8:
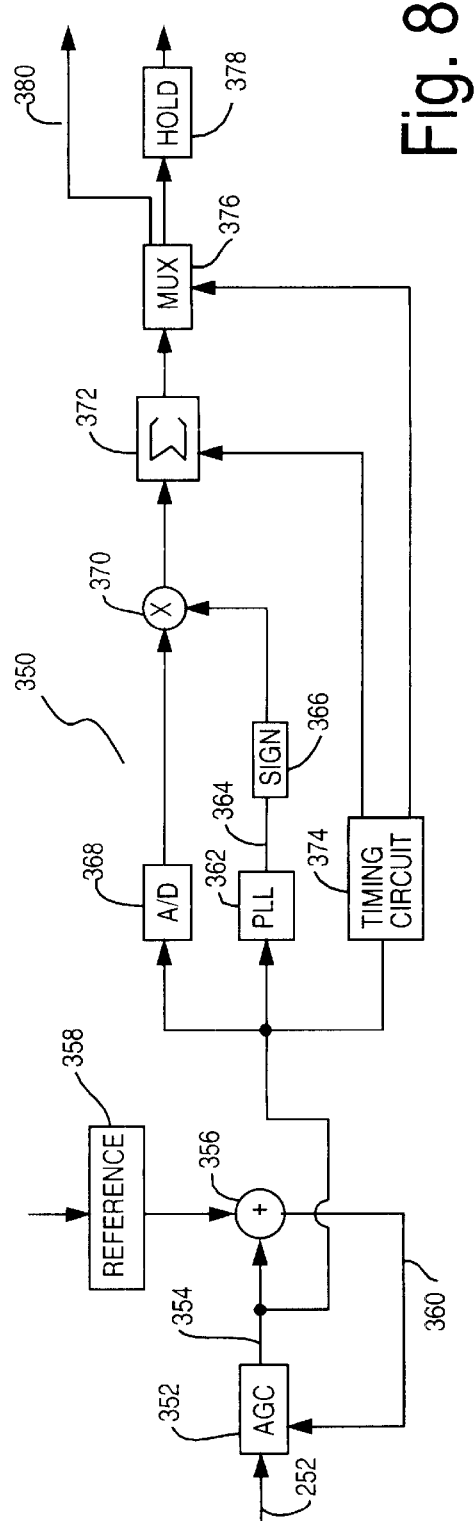
FIG. 8 is a block diagram of a digital demodulator of the prior art.

FIG. 8 is a block diagram of a digital demodulator 350, which is one embodiment of a prior art demodulator 254 of FIG. 2. Amplified signal 252 of FIG. 2 is provided to automatic gain control 352, which operates in a manner similar to automatic gain control 302 of FIG. 7. Gain control output 354 of automatic gain control 352 is provided to a summer 356 which subtracts a reference value 358 from the magnitude of gain control output 354 to provide a feedback value 360. Based on feedback value 360, automatic gain control 352 applies the proper gain to amplified signal 352. Gain control output 354 is also provided to a phase locked loop 362, which generates a clock signal 364 based on the phase field portion of the read signal. The sign of the clock signal is determined by a signum circuit 366, which provides a digital value representative of the sign of clock signal 364.

The clock signal generated by phase locked loop 362 continues even after the phase field portion of gain control output 354 ends and the normal position error signal and quadrature position error signal portions begin. The normal position error field signal is sampled and converted into a series of digital values by an analog-to-digital converter 368. The series of digital values is then rectified by the values generated by signum circuit 366 through a multiplier 370, which multiplies the signum output values by the series of digital signal values. A series of product values produced by multiplier 370 are input to a summer 372, which sums together the values over a period of time set by timing circuit 374. In most prior art systems, the product values are summed over a period of time associated with the central part of the normal position error field signal.

The sum produced by summer 372 is directed by a multiplexer 376 to a hold circuit 378, which holds the value for later use. The output of hold circuit 378 is the normal position error value.

The quadrature position error signal is also converted into a series of digital values by analog-to-digital converter 368. The series of digital values are then multiplied by the sign of clock signal 364 by multiplier 370. The series of product values produced by multiplier 370 are then summed together by summing circuit 372 under the control of timing circuit 374. The result of this summation is the quadrature position error value, which is directed by multiplexer 376 to an output 380. The quadrature position error value and the normal position error value are then used to calculate the position of the head in the track.

In both systems of the prior art shown in FIGS. 7 and 8, the automatic gain control and the phase locked loop must be precise circuits that are free from excessive drift. In light of this, in the prior art, a great deal of cost has been expended on improving the performance of these circuits.

Figure 9:
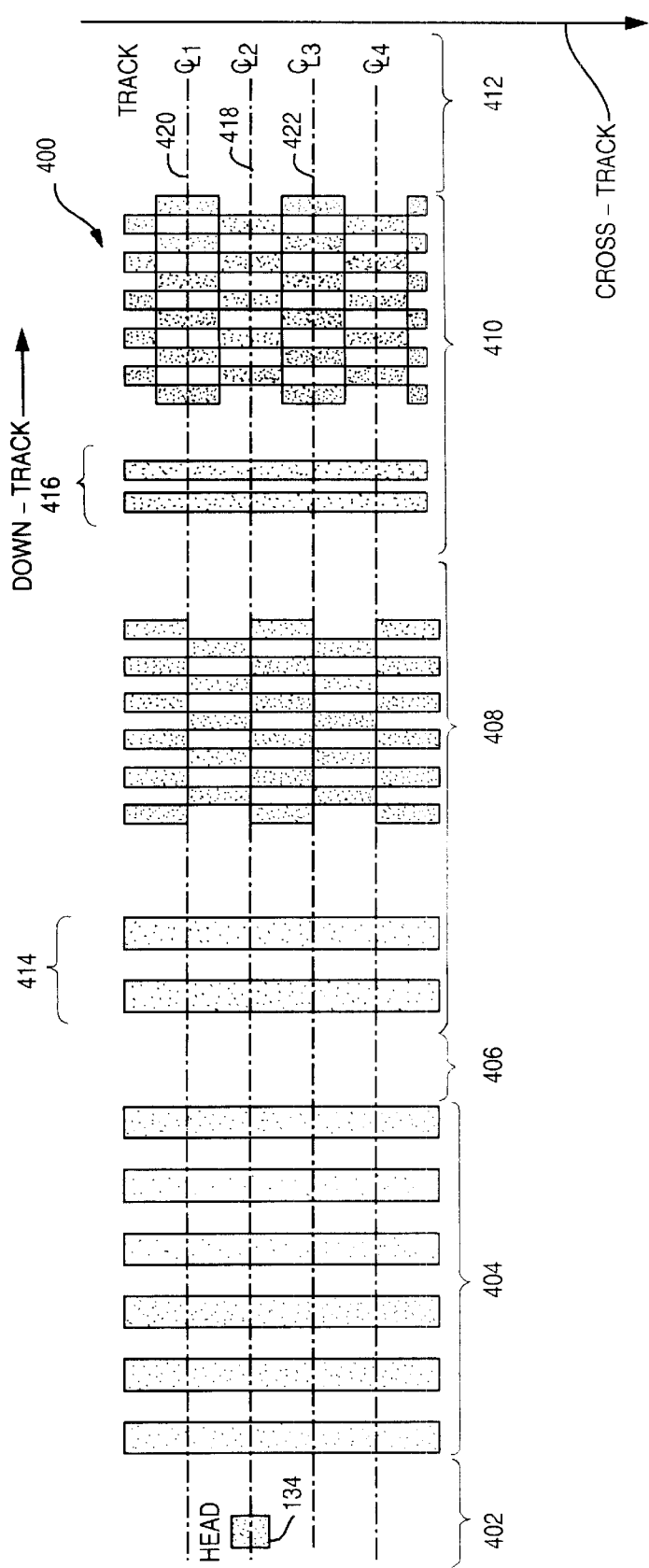
FIG. 9 is a pattern layout of a servo pattern of the present invention.

FIG. 9 is a pattern layout for a servo region 400 used in the present invention. In FIG. 9, the cross track direction is shown vertically and the down track direction is shown horizontally with a head 134 moving from left to right across the figure. Servo region 400 includes leading field 402, phase field 404, middle field 406, normal position error field 408, quadrature position error field 410 and trailing field 412. Leading field 402, middle field 406, and trailing field 412 are identical to the same named fields in the servo region of the prior art shown in FIG. 3. Phase field 404 in FIG. 9 is similar to phase field 202 in FIG. 3, except that, in general, phase field 404 has fewer transitions then phase field 202 of the prior art. Phase field 404 is shorter than phase field 202 because the present invention does not need the accurate phase locked loop that is found in the prior art and thus does not require as many transitions in the phase field as the prior art. Normal position error field 408 and quadrature position error field 410 are similar to prior art normal and quadrature position error fields 205 and 206, respectively, with the exception that normal position error field 408 and quadrature position error field 410 both include a set of radially coherent transitions 414 and 416 near the beginning of the respective fields. Radially coherent transitions 414 and 416 are similar to the transitions found in phase field 404. The use of these transitions is discussed further below.

Figure 10:
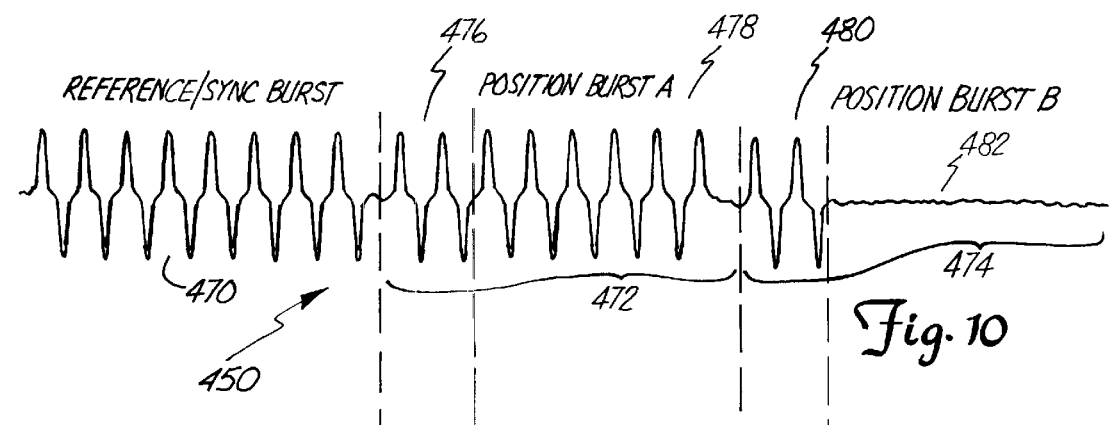
FIG. 10 is a read signal generated by a read head as it passes over the servo pattern of FIG. 9.
Figure 11:
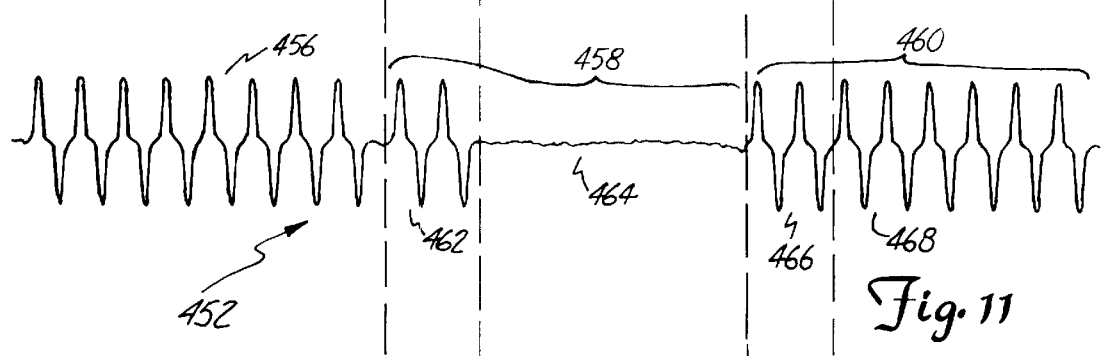
FIG. 11 is a read signal generated by a read head as it passes over the servo pattern of FIG. 9.
Figure 12:
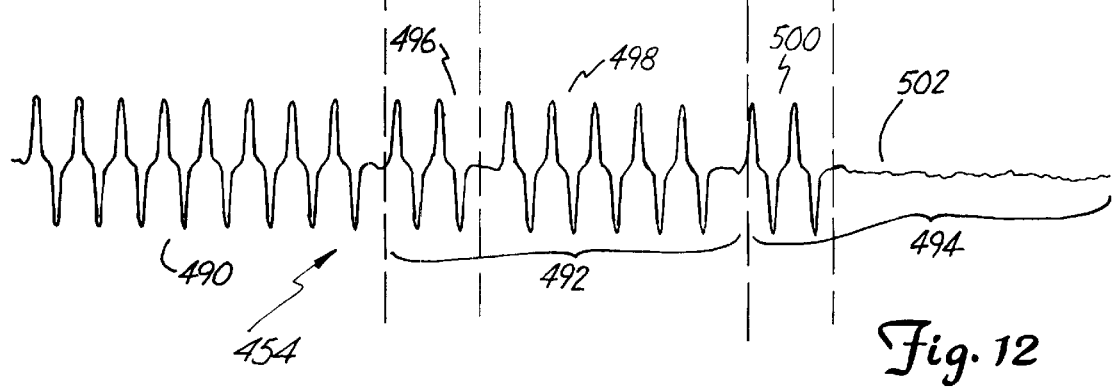
FIG. 12 is a read signal generated by a read head as it passes over the servo pattern of FIG. 9.

FIGS. 10, 11, and 12 are timing diagrams of example read signals 450, 452, and 454, respectively, which are produced by head 134 as it passes through servo region 400 of FIG. 9 at different track locations. In particular, servo read signal 452 of FIG. 11 is produced as head 134 passes along the centerline of track 418 of FIG. 9. Read signal 452 can be divided into three regions consisting of a phase field signal 456, a normal position error signal 458 and a quadrature position error signal 460. Phase field signal 456 is similar to the phase field signals found in FIGS. 4, 5, and 6 of the prior art. Normal position error signal 458 includes a trigger oscillation portion 462 and a null pattern portion 464. Trigger oscillation portion 462 is created when head 134 passes over the radially coherent transitions 414 of FIG. 9. Null pattern portion 464 is created when head 134 passes over the remainder of normal position error field 408. Since head 134 is centered on track centerline 418 when generating read signal 452, null pattern portion 464 is substantially equal to zero. Quadrature position error signal 460 can be divided into a trigger oscillation portion 466 and a null pattern portion 468, where oscillation trigger portion 466 is created by radially coherent transitions 416 of quadrature position error field 410 and null pattern portion 468 is created by the null pattern in the remainder of quadrature position error field 410.

Read signal 450 of FIG. 10 is generated when head 134 is located between track center 418 and track center 420 of FIG. 9. Read signal 450 can be divided into three portions including a phase field signal 470, a normal position error field signal 472, and a quadrature position error field signal 474. Normal position error field signal 472 can be subdivided into a trigger oscillation portion 476 and a null pattern portion 478. Quadrature position error field signal 474 can also be divided into a trigger oscillation portion 480 and a null pattern portion 482. Note that null pattern portion 478 of normal position error field signal 472 has a maximum amplitude while null pattern portion 482 of quadrature position error field signal 474 is substantially equal to zero because the read head is located halfway between two track center lines.

Read signal 454 of FIG. 12 is generated when head 134 is positioned half-way between track centers 418 and 422 of FIG. 9. Read signal 454 may be divided into three separate portions including a phase field signal 490, a normal position error signal 492, and a quadrature position error signal 494. Normal position error signal 492 may be further divided into a trigger oscillation portion 496 and a null pattern portion 498. Similarly, quadrature position error signal 494 may be divided into a trigger oscillation portion 500 and a null pattern portion 502.

Since both read signal 454 and read signal 450 are generated when head 134 is positioned half-way between respective track center lines, they have common features. For example, null pattern portions 482 and 502 of read signals 450 and 454, respectively, are both substantially equal to zero. In addition, null pattern portions 478 and 498 of read signals 450 and 454, respectively, have maximum amplitudes. Read signals 450 and 454 are not identical, because null pattern portion 478 is 180 degrees out of phase with null pattern portion 498. This is similar to the phase shift found in null type patterns of the prior art. Read signals 450 and 454 differ from the prior art in that trigger oscillation portions 476 and 496 are the same in normal position error signal 472 and normal position error signal 492 even though the null pattern portions are shifted 180 degrees out of phase from each other. In fact, the trigger oscillation portion of any normal position error field signal generated from servo region 400 of FIG. 9 is the same. Similarly the trigger oscillation portion found in a quadrature position error signal of the present invention would be the same at all head locations in servo region 400. The consistency of the trigger oscillation portion allows for a simplified circuit design as described further below.

Figure 14:
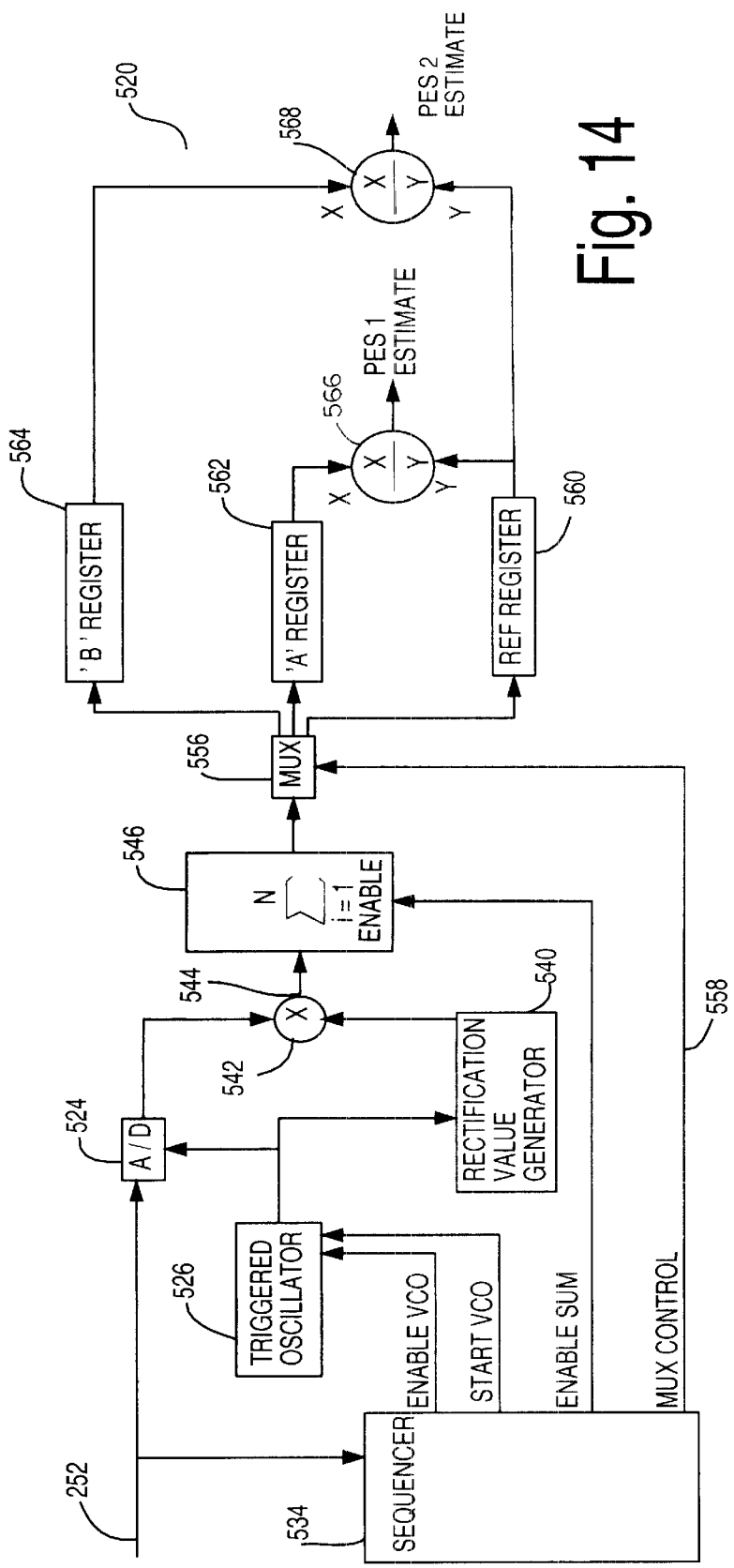
FIG. 14 is a block diagram of a digital demodulator of the present invention.

FIG. 14 is a block diagram of one embodiment of a demodulator 520 of the present invention. Demodulator 520 is a digital demodulator that converts amplified signal 252 of FIG. 2 into two position error signals. Demodulator 520 reduces the need for an automatic gain control circuit and phase locked loop by using an inventive technique of field ratioing. The layout and operation of demodulator 520 is described below with reference to FIG. 14 and with reference to timing diagrams shown in FIGS. 13-1 through 13-5.

FIG. 13-1 shows a read signal 522, which represents one segment of amplified signal 252 of FIG. 14. Read signal 522 is provided to an analog-to-digital converter 524 which samples the read signal at selected sampling points based upon a sample clock produced by a triggered oscillator 526. FIG. 13-2 shows a timing diagram of a sample clock signal 528 produced by triggered oscillator 526. Each positive-going transition in sample clock signal 528 causes analog-to-digital converter 524 to sample read signal 522 at that time, and to convert the sample into a digital value. In FIG. 13-1, the samples are shown as dots on read signal 522, such as sample dots 530 and 532. In the embodiment shown in FIGS. 13-1, 13-2, and 14, sample clock signal 528 has a frequency that is four times the fundamental frequency of read signal 522. However, the frequency of sample clock signal 528 does not need to be an integer multiple of the frequency of read signal 522. In fact, any frequency that provides adequate sampling of read signal 522 may be used.

Triggered oscillator 526 generates sample clock signal 528 based on control signals from a sequencer 534. Sequencer 534 includes a zero phase restart circuit, that is commonly known in the art, which uses portions of read signal 522 to generate an enable voltage controlled oscillator (VCO) signal 536 of FIG. 13-3 and a start voltage controlled oscillator (VCO) signal 538 of FIG. 13-4. To generate enable VCO signal 536 and start VCO signal 538, sequencer 534 uses the respective transitions located at the beginning of the phase field, the normal position error field, and the quadrature position error field of the servo region. Thus, referring to FIG. 9, sequencer 534 uses the first four transitions associated with phase field 404, and radially coherent transitions 414 and 416 of normal position error field 408 and quadrature position error field 410, respectively. Sequencer 534 insures that triggered oscillator 526 starts at a consistent phase relationship in each of the fields of servo region 400. To insure this phase relationship, sequencer 534 disables triggered oscillator 526 at the end of each field and re-enables triggered oscillator 526 at the beginning of each field.

Sample clock signal 528 is also provided to a rectification value generator 540 of FIG. 14, which produces a rectification value with each positive going transition in sample clock signal 528. The rectification values produced by rectification value generator 540 are provided to a multiplier 542, which also receives the digital values produced by analog-to-digital converter 524. Multiplier 542 multiplies the rectification values by the sampled data values to produce a series of product values 544 that are input to a summing circuit 546. Together, rectification value generator 540 and multiplier 542 rectify the values produced by analog-to-digital converter 524. This rectification can involve a simple rectification where all negative values produced by analog-to-digital converter 524 are multiplied by a rectification value of negative one and all positive values produced by analog-to-digital converter 524 are multiplied by a rectification value of positive one. In other embodiments, the rectification values produced by rectification value generator 540 can be more complex so as to suppress noisy samples or samples located on undesirable portions of the read signal.

FIGS. 15-1 and 15-2 are timing diagrams associated with one embodiment of the present invention in which the rectification values are chosen to suppress noisy samples taken from the read signal. Specifically, FIG. 15-1 shows a read signal 600 with sampled points represented by black dots. FIG. 15-2 shows rectification values generated by rectification value generator 540, with the values vertically aligned with the respective samples that are multiplied together to produce product values 540 of FIG. 14. From FIGS. 15-1 and 15-2, it can be seen that in this embodiment, samples taken at the peaks of the read signal are multiplied by either one or negative one depending on the sign of the sample. For example, sample 602 is multiplied by a rectification value 604 of negative one since sample value 602 is negative, whereas sample value 606 is multiplied by a rectification value 608 of positive one because sample value 606 is positive. In FIGS. 15-1 and 15-2, sample values that have magnitudes close to zero are multiplied by rectification values of zero. For example, sample value 610, which is nearly zero in read signal 600, is multiplied by a rectification value 612 of zero. By multiplying such low magnitude sample values by zero, the present invention suppress these values and prevents them from affecting the position error value calculation. This provides an advantage in the present invention since these low magnitude values can often be corrupted by noise. By suppressing them, the noise associated with these low magnitude values is also suppressed.

FIGS. 16-1 and 16-2 show a second embodiment of the invention where the rectification values are used to suppress undesirable samples taken from a read signal 620. Read signal 620 has peaks such as peaks 622 and 624 as well as shoulders 626 and 628. Shoulders 626 and 628 represent non-ideal portions of read signal 620. Thus, samples taken from shoulders 626 and 628 do not accurately represent the transitions stored in the medium. Under the embodiment of the invention shown in FIGS. 16-1 and 16-2, rectification values of zero are used to suppress samples taken from the shoulders. Thus, the samples associated with shoulders 626 and 628 are multiplied by rectification values of zero. The remaining rectification values are chosen to rectify the samples taken from the peaks. Thus, samples having negatives values are multiplied by negative one and samples having positive values are multiplied by positive one.

Those skilled in the art will recognize that the embodiments shown in FIGS. 15-1, 15-2, 16-1, and 16-2 are only examples of possible embodiments for the rectification values. Other sequences of rectification values are possible and are considered within the scope of the present invention.

Returning to FIG. 14, summing circuit 546 sums together a series of product values 544 for each of the fields in the servo region. Specifically, summing circuit 546 sums values for phase field 404, normal position error field 408, and quadrature position error field 410. In most embodiments, the time period over which the sum is taken is the same for each field and occurs at the same relative temporal location within each field. The time period over which the sum is taken is controlled by an enable sum signal generated by sequencer 534 and provided to summing circuit 546.

FIG. 13-5 shows a timing diagram for an enable sum signal 548. Enable sum signal 548 has three high regions 550, 552, and 554 occurring respectively during the phase field signal, the normal position error field signal, and the quadrature position error field signal. High portions 550, 552, and 554 are of equal duration and occur during the same relative period of time in the phase field signal, the normal position error field signal and the quadrature position error field signal. In most embodiments, enable sum signal 548 enables summing circuit 546 such that beginning and ending transition in each of the field's signals are not included in the sum. This helps to eliminate transitions from the sum that may be corrupted due to pulse crowding.

Summing circuit 546 produces a series of sum values including a phase field sum, a normal position error field sum, and a quadrature position error field sum. The sums are provided to a multiplexer 556, which is controlled by a multiplexer control signal 558 from sequencer 534. Multiplexer 556 sends the three sums from summing circuit 546 to three respective registers 560, 562, and 564. Register 560 stores the sum associated with the phase field signal, register 562 stores the sum associated with the normal position error field signal, and register 564 stores the sum associated with the quadrature position error field signal.

Under the present invention, the phase locked loop and the automatic gain control can be removed by using a technique of field ratioing that divides the sum associated with the normal position error field and the sum associated with the quadrature position error field by the sum associated with the phase field. By dividing each of the position error field sums by the phase field sum, the present invention normalizes these sums and eliminates gain factors that are common to all three fields. The division of the normal position error field sum by the phase field sum is performed by a division circuit 566 to produce a first position error signal estimate. The division of the quadrature position error field sum by the phase field sum is performed by a division circuit 568 to produce a second position error signal estimate. The first and second position error signal estimates are then combined using known techniques to determine the location of the head within the track.

The normalization performed by the demodulator of the present invention shown in FIG. 14 removes certain errors in the position error sample that would otherwise arise due to the demodulation hardware. To show this, the sampled read data produced by analog-to-digital converter 524 can be defined as:

$$y^*(t)=Y(t)\cdot\delta(t-n)\ T_s)  \qquad \text{EQ. 1}$$

where y*(t) is the sampled read data, Y(t) is the amplified signal received by analog-to-digital converter 524, t is time, $\delta$ is an impulse function, n is the number of this sample, and ($T_s$) is the sample clock period.

The steps of multiplying the samples by a rectification value and summing the product can be represented by:

$$S_x = \sum_{n=1}^{N} Y(t)\cdot\delta(t-nT_S)\cdot R_n \qquad \text{EQ. 2}$$

where $S_x$ is the sum produced by summing circuit 546 of FIG. 14, $R_n$ is the rectification value associated with the nth sample, and N is the number of samples taken over the region. In FIG. 14, the sum of Equation 2 is taken over three separate fields. Thus, the read signal can be divided into three sections represented as:

$$Y_{nPEF}(t)=A_{nPEF}f(t) \qquad \text{EQ. 3}$$

$$Y_{qPEF}(t)=A_{qPEF}f(t) \qquad \text{EQ. 4}$$

$$Y_{PF}(t)=A_{PF}f(t) \qquad \text{EQ. 5}$$

where $Y_{nPEF}(t)$ is the read signal from the normal position error field, $A_{nPEF}$ is the amplitude of the read signal in the normal position error field, f(t) is a generalized function representing the read signal at all three fields, $Y_{qPEF}(t)$ is the portion of the read signal from the quadrature position error field, $A_{qPEF}$ is the amplitude of the read signal in the quadrature position error field, $Y_{PF}(t)$ is the read signal from the phase field and $A_{PF}$ is the amplitude of the read signal in the phase field.

Combing equations 2, 3, and 5, the division performed by division circuit 566 of FIG. 14 can be represented as:

$$PES1 = \frac{\sum_{n=1}^{N} A_{nPEF}f(t)\cdot\delta(t-nT_S)\cdot R_n}{\sum_{n=1}^{N} A_{PF}f(t)\cdot\delta(t-nT_S)\cdot R_n} \qquad \text{EQ. 6}$$

where PES1 is the first position error signal estimate produced by division circuit 556.

Making the common assumption that f(t) is the same in the normal position error field and in the phase field, that the phase of the sample clock is the same in both fields; and requiring that the rectification values used in the normal position error field match the rectification values used in the phase field, Equation 6 can be simplified to:

$$PES1 = \frac{A_{nPEF}}{A_{PF}} \quad \text{EQ. 7}$$

Similiarly, the division performed by division circuit 568 an be represented by:

$$PES2 = \frac{\sum_{n=1}^{N} A_{qPEF} f(t) \cdot \delta(t - nT_S) \cdot R_n}{\sum_{n=1}^{N} A_{PF} f(t) \cdot \delta(t - nT_S) \cdot R_n} \quad \text{EQ. 8}$$

where PES2 represents the second position error signal produced by division circuit 568. Using the assumptions described above, equation 8 can also be simplified to:

$$PES2 = \frac{A_{qPEF}}{A_{PF}} \quad \text{EQ. 9}$$

Equations 7 and 9 show that any errors that consistently appear in f(t) are removed by the divisions performed at division circuits 566 and 568. In addition, since the sampling period $T_s$ is cancelled out in Equations 7 and 9 if the sampling period is the same in each field of a servo region, it can be seen that the sampling period does not need to be the same for each servo region as long as the sampling period is consistent in all of the fields within a single servo region. Thus, a highly accurate phase locked loop is not needed since the sampling clock does not need to be the same at each servo region. Instead, a consistent triggered oscillator can be used as shown in FIG. 14. It should also be noted that $R_n$ can have any values as long as $R_n$ is consistent in all three fields in the servo region. Thus, the values of $R_n$ can be chosen to eliminate noisy samples without impacting the position error signal estimate. In addition, different $R_n$ values can be used at different servo regions to maximize the performance of the demodulator.

Even with the present invention, some errors can negatively impact the position error signal estimates. In particular, if the frequency of the triggered oscillator is different during the phase field than during the position error field or if the triggered oscillator begins at a different relative time in each field, errors in the position error signal estimate can arise. The affects of these errors can be seen in:

$$PES1 = \frac{A_{nPEF} \sum_{n=1}^{N} f(t) \cdot \delta(t - n(T_S + T_E) - S_E) \cdot R_n}{A_{PF} \sum_{n=1}^{N} A_{PF} f(t) \cdot \delta(t - nT_S) \cdot R_n} \quad \text{EQ. 10}$$

where the division of the summation values represents an error coefficient that is multiplied by the ratio of the amplitude of the normal position error field signal to the amplitude of the phase field signal. In equation 10, $T_E$ represents the difference between the sampling period during the normal position error field and the sampling period during the phase field, and $S_E$ represents the start error between when the triggered oscillator starts in the normal position error field and when it starts in the phase field. A similar equation can be written for PES2 to describe errors introduced by triggered oscillator 526 into the second position error signal estimate. Based on the equations above, the present inventors found that the difference in start times should be less than approximately 0.7% of a data cycle in order to keep the demodulation error below 1% of the track width.

Figure 17:
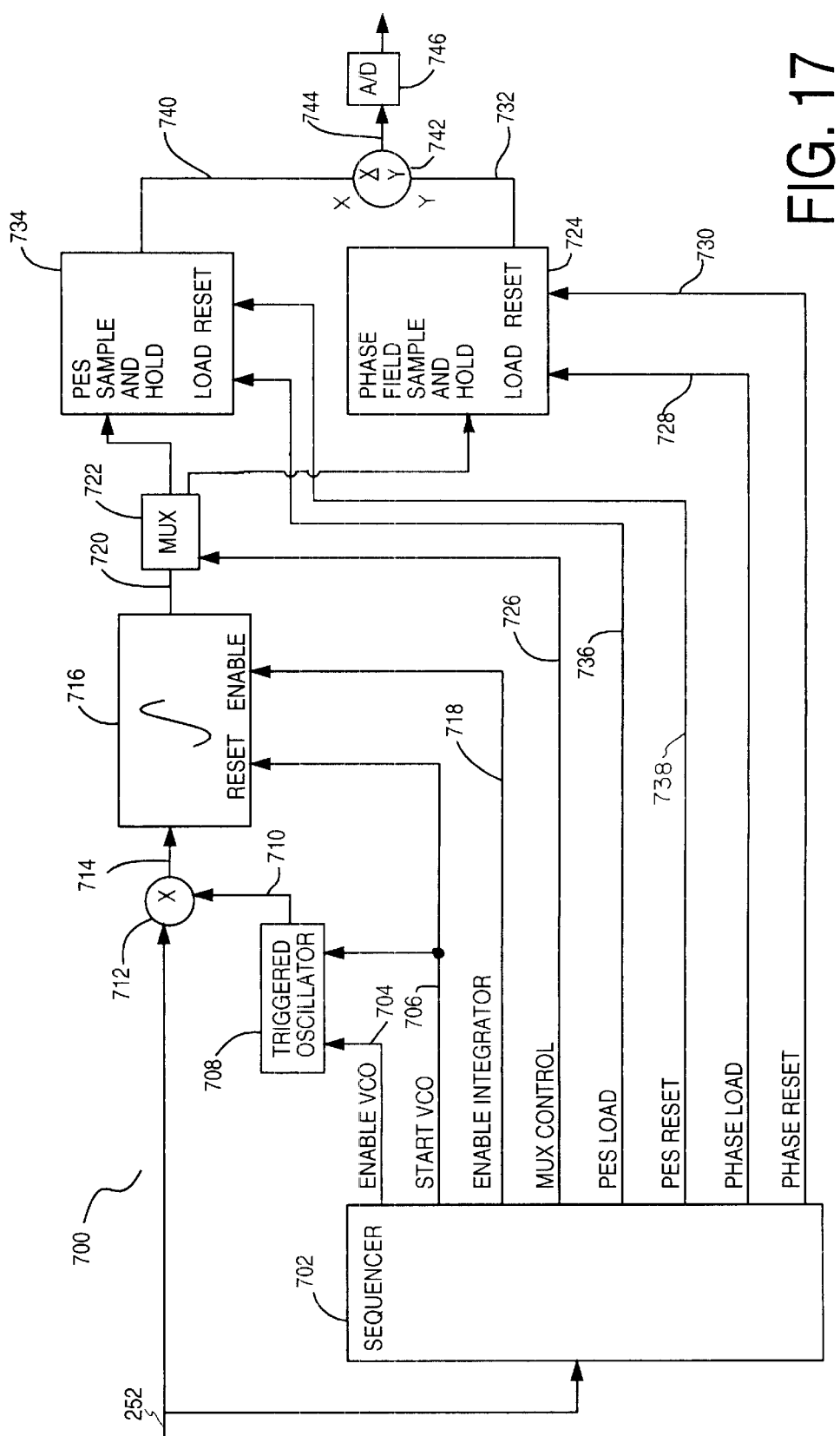
FIG. 17 is a block diagram of an analog demodulator of the present invention.

The present invention can also be implemented as an analog demodulator 700, which is shown in block diagram form in FIG. 17. In demodulator 700, amplified signal 252 of FIG. 2 is received by a sequencer 702, which provides a number of different timing signals for the remainder of demodulator 700. Sequencer 702 bases these timing signals on amplified signal 252, an example of which is shown in the timing diagram of FIG. 18-1. Two of the signals generated by sequencer 702 are an enable voltage controlled oscillator (VCO) signal 704 shown in the timing diagram of FIG. 18-3 and a start voltage controlled oscillator (VCO) 706 shown in the timing diagram of FIG. 184. Enable (VCO) signal 704 is provided to a triggered oscillator 708, which produces a multiplier clock signal 710 shown in FIG. 18-2. Triggered oscillator 708 also receives start VCO 706 from sequencer 702. With enable VCO 704 high, triggered oscillator 708 will begin to produce multiplier clock signal 710 after start VCO 706 goes high. Triggered oscillator 708 will continue to produce multiplier clock signal 710 until enable VCO signal 704 returns to low. In most embodiments of the invention, multiplier clock signal 710 is a square-wave clock signal oscillating between negative one and positive one.

Through enable VCO signal 704 and start VCO signal 706, sequencer 702 restarts clock signal 710 at each field in the servo region. Specifically, clock signal 710 is restarted each time the head enters a phase field, a normal position error field, and a quadrature position error field. Sequencer 702 generates enable VCO 704 and start VCO 706 based on the first sets of transitions in each field. In particular, sequencer 702 uses the first sets of transistions in the phase field, and the sets of transitions associated with the oscillation trigger portions of the normal position error field and the quadrature position error field such as oscillation trigger portions 414 and 416 of FIG. 9. Since sequencer 702 uses radially coherent transitions to start triggered oscillator 708, the clock signal produced by triggered oscillator 708 will have the same beginning phase relationship to amplified signal 252 in each of the fields regardless of the heads radial position.

Under the present invention, multiplier clock signal 710 does not necessarily have the same frequency as the fundamental frequency of amplified signal 252. In addition, multiplier clock signal 710 does not necessarily have a frequency that is an integer multiple of the fundamental frequency of amplified signal 252.

Multiplier clock signal 710 and amplified read signal 252 are both provided to a multiplier 712 which multiplies the two signals together to provide an analog product signal 714. Analog product signal 714 can be divided into three portions representing those portions of amplified signal 252 that correspond to the phase field, the normal position error field, and the quadrature position error field of the servo region.

An integrator 716 integrates each of the portions of product signal 714 under the control of start VCO signal 706 and enable integrator signal 718 shown in the timing diagram of FIG. 18-5. Integrator 716 is reset by start VCO 706 at the beginning of each portion of product signal 714. Enable integrator signal 718 enables integrator 716 for a small period during each portion of product signal 714. In one embodiment, integrator 716 is enabled during a period that excludes transitions at the beginning and end of the phase field, the null pattern portions in the normal position error field and the null pattern portions in the quadrature position error field. In such embodiments, the period of integration is the same in each portion of product signal 714. Thus the period of integration in the portion of product signal 714 associated with the phase field is the same as the period of integration for the normal position error field and the quadrature position error field.

After each integration, integrator 716 produces an analog value resulting in a sequence of integrands 720 at its output. The first integrand in the sequence of integrands 720 is a phase field integrand, which is directed by a multiplexer 722 to an analog phase field sample-and-hold circuit 724. Multiplexer 722 directs the integrand to phase field sample and hold circuit 724 based on a multiplexer control signal 726 shown in FIG. 18-6. Multiplexer control signal 726 is high during the period of time when integrator 716 is producing the integrand for the phase field and is low during the periods of time when integrator 716 is producing integrands for the normal position error field and the quadrature position error field.

Phase field sample-and-hold circuit 724 receives a phase load signal 728 and a phase reset signal 730 from sequencer 702. Examples of phase load signal 728 and phase reset signal 730 are shown in FIGS. 18-9 and 18-10, respectively. Phase reset signal 730 resets phase field sample-and-hold circuit 724 just before the phase integrand is produced by integrator 716. Phase load signal 728 places phase field sample-and-hold circuit 724 in a state to receive the phase integrand from multiplexer 722 just after integrator 716 produces the phase integrand. This is shown in FIGS. 18-9 and 18-5 where phase load signal 728 goes high just as enable integrator signal 718 goes low for the phase field. Once the phase field integrand has been loaded into phase field sample-and-hold circuit 724, phase field sample-and-hold circuit 724 produces the phase integrand at its output 732 until it is reset.

After the phase field integrand, integrator 716 produces the normal position error field integrand. This integrand is routed to a position error signal sample-and-hold circuit 734 by multiplexer 722. Position error signal sample-and-hold circuit 734 is controlled by a PES load signal 736 and a PES reset signal 738, which are shown in FIGS. 18-7 and 18-8, respectively. PES reset signal 738 resets PES sample-and-hold circuit 734 just before the normal position error field integrand is produced. This clears PES sample-and-hold circuit 734 of any previous values that it may have been holding. PES load signal 736 sets PES sample-and-hold circuit 734 so that it accepts an integrand produced by multiplexer 722. PES load signal 736 goes high just as enable integrator signal 718 goes low for the normal position error field. Thus, PES load signal 736 goes high just as integrator 716 produces the normal position error field integrand. Position error signal sample-and-hold circuit 734 holds the normal position error field integrand at its output 740 until it is reset by PES reset signal 738.

Outputs 732 and 740 of sample-and-hold circuits 724 and 734 are provided to a division circuit 742, which divides the normal position error field integrand by the phase field integrand. This produces a first position error signal estimate at the division output 744, which is provided to an analog-to-digital converter 746 to produce a digital first position error signal estimate.

PES reset signal 738 resets PES sample-and-hold circuit 734 just before integrator 716 produces the quadrature position error field integrand. PES load signal 736 then sets PES sample-and-hold circuit 734 so that it accepts the quadrature position error field integrand and holds the integrand at its output 740. Division circuit 742 then divides the quadrature position error field integrand by the phase field integrand to produce a second position error field estimate that is provided to analog-to-digital converter 746. The second position error signal estimate is converted by analog-to-digital converter 746 into a digital second position error signal estimate. As in the digital version of the present invention, the division of the normal position error signal integrand and the quadrature position error signal integrand by the phase field integrand eliminates common errors introduced by the servo system into each integrand. This allows for the elimination of the AGC circuit and the phase locked loop under the present invention.

Figure 19:
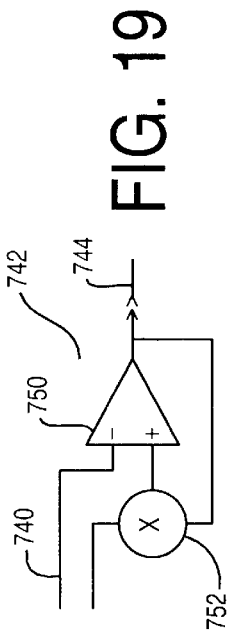
FIG. 19 is a block diagram of an analog division circuit used in FIG. 17.

FIG. 19 shows one embodiment of division circuit 742 of FIG. 17. In FIG. 19, the output 740 of position error signal sample-and-hold circuit 734 is provided to the inverting input of an operational amplifier 750. The output of operational amplifier 750 is fed to a multiplier 752, which also receives output 732 of phase field sample-and-hold circuit 724. The output of multiplier 752 is provided to the non-inventing input of amplifier 750.

Although the description of analog demodulator 700 found above shows that the analog values are not converted into digital values until after the position error field integrand has been divided by the phase field integrand, in other embodiments, the integrands may be converted into digital values at any point after integrator 716.

In summary, the present invention provides a method of determining a location of a read head 110 over a storage medium 106 based on a servo signal 522 generated by the read head 110 as the read head 110 passes over a phase field 404 and a position error field 408, 410. The method includes performing a demodulating set of operations 542, 546, 712, 716 on a portion 456 of the servo signal 452 associated with the phase field 404 to produce a phase field value 732. It also includes performing a demodulating set of operations 542, 546, 712, 716 on a portion 458, 460 of the servo signal 452 associated with the position error field 408, 410 to produce a position error field value and dividing the position error field value by the phase field value to produce a position error estimate 744 indicative of the location of the read head over the storage medium.

The invention also includes a method of determining a position error signal 744 indicative of a position of a read head 110 over a storage medium 106. The method includes passing the read head 110 over a phase field 404 to generate a phase field signal 456 and generating a phase field demodulating signal 710, $R_n$, having a phase set by a portion of the phase field signal 456. The read head 110 then passes over a position error field 408, 410 to generate a position error field signal 458, 460. A position error field demodulating signal 710, $R_n$ is produced having a phase set by a portion 462, 466 of the position error field signal 458, 460. The demodulating phase field signal 710, $R_n$ is used to demodulate the phase field signal 456 to produce a phase field normalization factor 732. The demodulating position error field signal 710, $R_n$ is used to demodulate the position error field signal 458, 460 to produce an unscaled position error signal value. The unscaled position error signal value is divided by the normalization factor 732 to produce a scaled position error value 744.

The invention also includes a demodulation circuit 520, 700 for demodulating a servo signal 450, 452, 454 to produce a position error signal value 744. The circuit includes a rectification circuit 540, 542, 708, 712 for rectifying a phase field signal 456, 470, 490 and a position error field signal 458, 460, 472, 474, 492, 494 to produce a rectified phase field signal and a rectified position error field signal. The demodulation circuit also includes a summing circuit 546, 716 coupled to the rectification circuit and capable of summing values of the rectified phase field signal over time to produce a normalization factor 732 and capable of summing the values of the position error field signal over time to produce an unscaled position error field value. A division circuit 566, 568, 742 is capable of receiving the normalization factor 732 and the unscaled position error field value and is capable of dividing the unscaled position error field value by the normalization value to produce a position error signal value 744.

Although the present invention has been described with reference to eliminating the phase locked loop and automatic gain control, those skilled in the art will recognize that the present invention may be practiced in a disc drive that retains a phase locked loop and an automatic gain control.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, demodulation of the phase and position error fields can be performed sequentially with the same circuitry or can be performed by parallel circuitry depending on the particular application without departing from the scope and spirit of the present invention. Other modifications can also be made.

What is claimed is:

1. A demodulation circuit for demodulating a servo signal in a data storage device to produce a position error signal value, the servo signal comprising a phase field signal and a position error field signal, the demodulation circuit comprising:

a rectification circuit capable of receiving and at least partially rectifying the phase field signal and the position error field signal to produce a rectified phase field signal and a rectified position error field signal;

a summing circuit coupled to the rectification circuit and capable of summing values of the rectified phase field signal over time to produce a normalization factor and capable of summing values of the position error field signal over time to produce an unscaled position error field value; and a division circuit capable of receiving the normalization factor and the unscaled position error field value and of dividing the unscaled position error field value by the normalization factor to produce a position error signal value.

2. The demodulation circuit of claim 1 wherein the summing circuit comprises an analog integrator.

3. The demodulation circuit of claim 2 wherein the division circuit comprises an analog division circuit.

* * * * *

UNITED STATES PATENT AND TRADEMARK OFFICE
CERTIFICATE OF CORRECTION

PATENT NO. : 6,469,849 B1
DATED : October 22, 2002
INVENTOR(S) : Ellis et al.

It is certified that error appears in the above-identified patent and that said Letters Patent is hereby corrected as shown below:

<u>Column 12,</u>
Replace Equation 1 with the following:

-- $y^*(t) = Y(t) \cdot \delta(t - nT_S)$ --

Signed and Sealed this

Twenty-first Day of January, 2003

JAMES E. ROGAN
*Director of the United States Patent and Trademark Office*